(12) United States Patent
John et al.

(10) Patent No.: US 10,087,882 B2
(45) Date of Patent: Oct. 2, 2018

(54) PISTON DESIGN FOR SPLITTING JETS (71) Applicant: Caterpillar Inc., Peoria, IL (US)

(72) Inventors: Bobby John, Peoria, IL (US);
Jonathan W. Anders, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 142 days.

(21) Appl. No.: 15/338,643

(22) Filed: Oct. 31, 2016

(65) Prior Publication Data

US 2018/0119637 A1 May 3, 2018

(51) Int. Cl.
| | |
|---|---|
| *F02B 17/00* | (2006.01) |
| *F01B 31/00* | (2006.01) |
| *F02F 3/00* | (2006.01) |
| *F02F 3/28* | (2006.01) |
| *F02F 1/24* | (2006.01) |
| *F02M 61/14* | (2006.01) |
| *F02F 3/24* | (2006.01) |
| *F02B 23/06* | (2006.01) |

(52) U.S. Cl.
CPC .............. *F02F 3/28* (2013.01); *F02F 1/242* (2013.01); *F02F 3/24* (2013.01); *F02M 61/14* (2013.01); *F02B 23/0624* (2013.01)

(58) Field of Classification Search
CPC ..... F02F 3/24; F02F 1/242; F02F 3/28; F02B 23/0624; F02B 23/0678; F02B 23/0687; F02M 61/14
USPC ................ 123/295, 298, 193.6; 92/173
See application file for complete search history.

(56) References Cited

U.S. PATENT DOCUMENTS

| 4,176,628 A | 12/1979 | Kanai et al. |
| 4,467,752 A | 8/1984 | Yunick |
| 4,616,612 A | 10/1986 | Jane |
| 5,215,052 A | 6/1993 | Augustin |
| 5,285,755 A * | 2/1994 | Regueiro ............... F01L 1/26 123/193.6 |
| 9,091,199 B2 | 7/2015 | Straub |
| 9,279,361 B2 | 3/2016 | Rothbauer et al. |
| 9,476,381 B2 * | 10/2016 | Bowing ............. F02B 23/0621 |
| 2011/0271932 A1 * | 11/2011 | Fuqua ..................... F01B 7/02 123/301 |

FOREIGN PATENT DOCUMENTS

| DE | 2407783 A1 | 9/1974 |
| DE | 3742574 C1 | 3/1989 |
| FR | 1373853 A | 10/1964 |
| JP | 61-232320 A | 10/1986 |
| JP | 11-93673 A | 4/1999 |

* cited by examiner

*Primary Examiner* — Syed O Hasan
(74) *Attorney, Agent, or Firm* — Leydig, Voit & Mayer, Ltd.

(57) ABSTRACT

A piston has a piston crown portion forming at least one arcuate indent in aligned fashion with a fuel jet discharged into a combustion chamber. Each arcuate event forms lobes, which separate the fuel jet into portions, or is tiered, to accommodate fuel jet portions being discharged into the combustion chamber at different times. Each lobe or tier includes an entry surface, a recirculation surface and a wall to separate it from adjacent lobes or tiers, respectively.

15 Claims, 5 Drawing Sheets

PISTON DESIGN FOR SPLITTING JETS

TECHNICAL FIELD

This patent disclosure relates generally to internal combustion engines and, more particularly, to combustion chamber features for direct injection engines.

BACKGROUND

Most modern engines are direct injection engines, which means that each combustion cylinder of the engine includes a dedicated fuel injector configured to inject fuel directly into a combustion chamber. While direct injection engines represent an improvement in engine technology over past designs, in the form of increased engine efficiency and reduced emissions, the improvement of the design of any particular engine is always desirable, especially in light of increasing fuel costs and ever more strict regulations on engine emissions.

In a traditional direct injection engine, one or more fuel jets that are injected into a combustion chamber interact with various combustion chamber structures, which cause the fuel to disperse into the combustion chamber. More specifically, the fuel jet(s) entering the combustion chamber impact various surfaces of the combustion chamber such as a piston bowl, the flame deck surface of the cylinder head, the cylinder liner or bore, and other surfaces before spreading in all directions. The impingement of the fuel jets with these structures may have a variety of effects including increased emissions because localized areas having higher fuel concentrations may burn rich while other areas on the cylinder may burn lean. This can further result in higher temperatures, decreased fuel efficiency, increased heat rejection and component temperatures, and the like.

Various solutions have been proposed in the past for improving an engine's efficiency and reducing its emissions. One example of a previously proposed solution can be seen in U.S. Pat. No. 9,091,199 ("Straub"), which was granted on Jul. 28, 2015. Straub describes a combustion chamber that includes a piston forming deflection foils. The deflection foils, according to Straub, operate to distribute a fuel spray into portions directed toward one of the deflection foils, which redirect their respective portion of the fuel spray into a combined radial path that swirls about a center of the combustion. In the described embodiment, Straub explains that the fuel spray is thus directed substantially tangential relative to the combined radial path of the redirected portions of the fuel spray. While the flow redirection of Straub may be partially effective in improving mixing of air with incoming fuel in the combustion chamber, the momentum of the redirected fuel spray is maintained generally parallel to a top piston surface such that the induced swirling may cause fuel to migrate towards a cylinder wall. Maintaining the fuel close to the piston may also increase heat rejection while the fuel is burning.

SUMMARY

In one general aspect, the disclosure describes a piston for use in an internal combustion engine. The piston has a piston crown portion forming at least one arcuate indent in aligned fashion with a fuel jet discharged into a combustion chamber. Each arcuate event forms lobes, which separate the fuel jet into portions, or is tiered, to accommodate fuel jet portions being discharged into the combustion chamber at different times. Each lobe or tier includes an entry surface, a recirculation surface and a wall to separate it from adjacent lobes or tiers, respectively.

Accordingly, in one aspect, the disclosure describes an internal combustion engine. The internal combustion engine includes an engine block having at least one cylinder bore, a cylinder head having a flame deck surface disposed at one end of the cylinder bore, a piston connected to a rotatable crankshaft and configured to reciprocate within the cylinder bore, the piston having a crown portion facing the flame deck surface such that a combustion chamber is defined within the cylinder bore and between a top surface of the crown portion and the flame deck surface, and a fuel injector having a nozzle tip disposed in fluid communication with the combustion chamber, the nozzle tip having at least one nozzle opening configured to inject a fuel jet into the combustion chamber and along a fuel jet centerline. At least one arcuate indent is formed in the top surface. The at least one arcuate indent is aligned with the fuel jet centerline and includes two or more lobes, each of the two or more lobes including an entry surface extending from a central portion of the piston, a recirculation surface having a concave shape and extending along a spiral direction adjacent the entry surface, and a wall extending generally in an axial direction and disposed radially along the recirculation surface. During operation, a single fuel jet provided into the at least one arcuate indent is separated into a plurality of fuel jet portions, each of the plurality of fuel jet portions corresponding to one of the two or more lobes.

In another aspect, the disclosure describes an internal combustion engine that includes an engine block having at least one cylinder bore, a cylinder head having a flame deck surface disposed at one end of the cylinder bore, a piston connected to a rotatable crankshaft and configured to reciprocate within the cylinder bore, the piston having a crown portion facing the flame deck surface such that a combustion chamber is defined within the cylinder bore and between a top surface of the crown portion and the flame deck surface, and a fuel injector having a nozzle tip disposed in fluid communication with the combustion chamber, the nozzle tip having at least one nozzle opening configured to inject a fuel jet into the combustion chamber and along a fuel jet centerline. At least one arcuate indent formed in the top surface. The at least one arcuate indent is aligned with the fuel jet centerline and includes two or more tiers, each of the two or more tiers including an entry surface extending up to a radial distance from a central portion of the piston, a recirculation surface having a concave shape and extending along a spiral direction adjacent the entry surface, a wall extending generally in an axial direction and disposed radially along the recirculation surface, and a step extending between adjacent tiers. During operation, a fuel jet provided as fuel jet portions discharged into the combustion chamber at different times is configured to be redirected as each fuel jet portion engages at least one tier of the arcuate indent.

DETAILED DESCRIPTION

This disclosure relates to internal combustion engines and, more particularly, to features incorporated within at least one combustion chamber of the engine to contain and redirect fuel jets or streams of liquid and/or gaseous fuel provided by separate fuel injector nozzle openings. The fuel jets are redirected and also segregated during a majority of the injection time to promote better fuel/air mixing and a more uniform fuel/air mixture within the combustion chamber as compared to previously proposed or known combustion systems. The various exemplary embodiments described herein include structures and features that operate or result in redirecting fuel jets circumferentially with respect to the cylinder bore of an engine, to thus avoid, minimize or, at least, delay interaction between adjacent fuel jets entering the combustion chamber. The design features redirect each fuel jet separately to create a spiral motion within the combustion chamber independently from any swirl generated from the use of valve inserts or port design changes. In the described embodiments, this is accomplished, at least in part, by directing an impact or impingement of one or more jets of combusting fuel towards an interior of the combustion chamber and away from the cylinder head, the valves, and the cylinder liner. The combustion and heat release are, in this fashion, kept away from surfaces and insulated within the combustion chamber by the surrounding fluids within the combustion chamber, which in turn leads to lower component temperatures, increased fuel efficiency, and a more uniform fuel/air mixture, which also leads to lower engine emissions.

Figure 1:
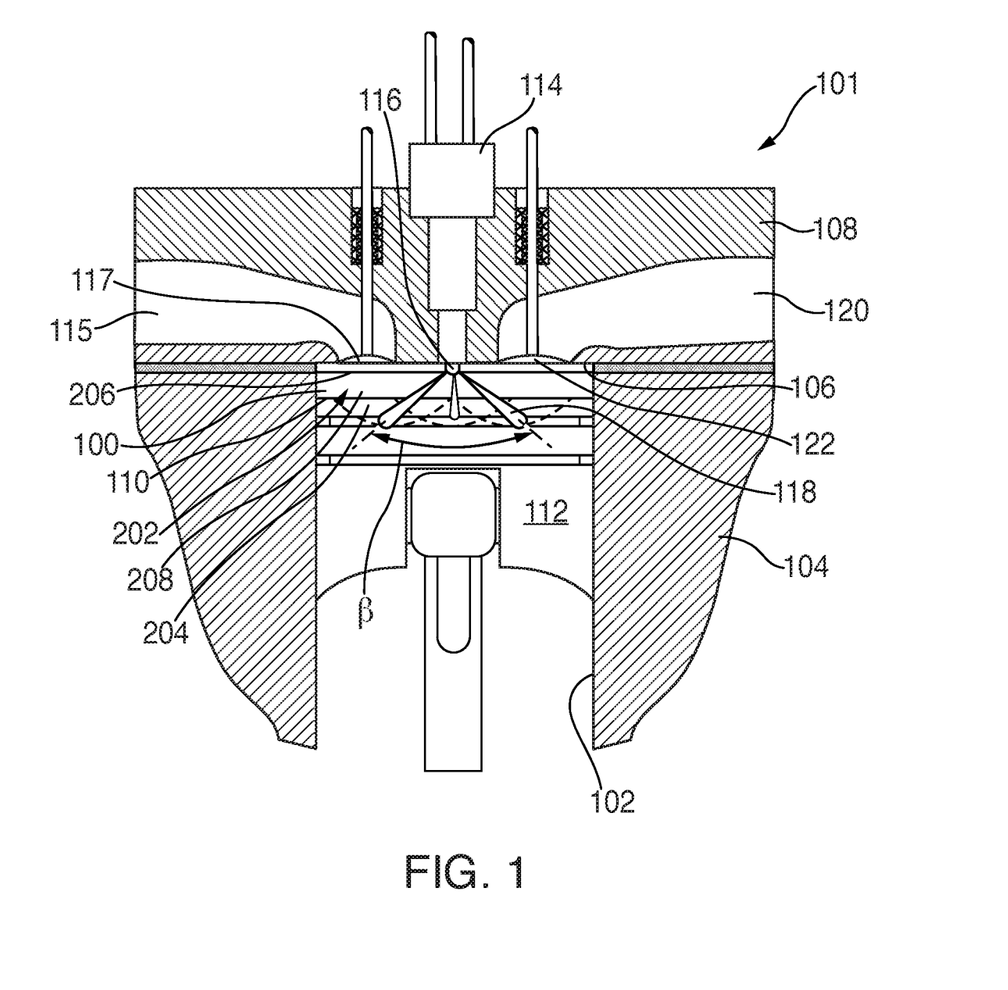
FIG. 1 is a cross section of an engine combustion chamber in accordance with the disclosure.

A cross section of a combustion chamber 100 of an engine 101 in accordance with the disclosure is shown in FIG. 1. The combustion chamber 100 has a generally cylindrical shape that is defined within a cylinder bore 102 formed within a crankcase or engine block 104 of the engine. The combustion chamber 100 is further defined at one end by a flame deck surface 106 of a cylinder head 108, and at another end by a piston crown 110 of a piston 112 that is reciprocally disposed within the bore 102. A fuel injector 114 is mounted in the cylinder head 108. The injector 114 has a tip 116 that protrudes within the combustion chamber 100 through the flame deck surface 106 such that it can directly inject fuel into the combustion chamber 100.

During operation of the engine 101, air is admitted into the combustion chamber 100 via an air inlet passage 115 when one or more intake valves 117 (one shown) are open during an intake stroke. In a known configuration, high pressure fuel is permitted to flow through nozzle openings in the tip 116 to form fuel jets that enter the combustion chamber 100. Each nozzle opening creates a fuel jet 118 that generally disperses to create a predetermined fuel/air mixture, which in a compression ignition engine auto-ignites and combusts. The fuel jets 118 may be provided from the injector at an included angle, β, of between 110 and 150 degrees, but other angles may also be used. Following combustion, exhaust gas is expelled from the combustion chamber through an exhaust conduit 120 when one or more exhaust valves 122 (one shown) is/are open during an exhaust stroke.

The uniformity and extent of fuel/air mixing in the combustion cylinder is relevant to the combustion efficiency as well as to the amount and type of combustion byproducts that are formed. For example, fuel-rich mixtures, which may be locally present within the combustion chamber 100 during a combustion event due to insufficient mixing, may lead to higher soot emissions and lower combustion efficiency. In the illustrated embodiments, more-uniform fuel/air mixing is managed for each fuel jet by forming a plurality of arcuate indents symmetrically around and into the crown surface of the piston. Each arcuate indent serves to accept, contain, redirect and segregate therein one of a plurality of fuel streams originating from one of a plurality of nozzle openings in the fuel injector from mixing with other fuel streams from the remaining nozzle openings, at least for a period, during an injection and/or fuel burning event in the combustion chamber during operation. Each arcuate indent presents a cambered, pitched face on the top surface of the piston, which leads into a concave feature formed or otherwise constructed into the top piston face.

Figure 2:
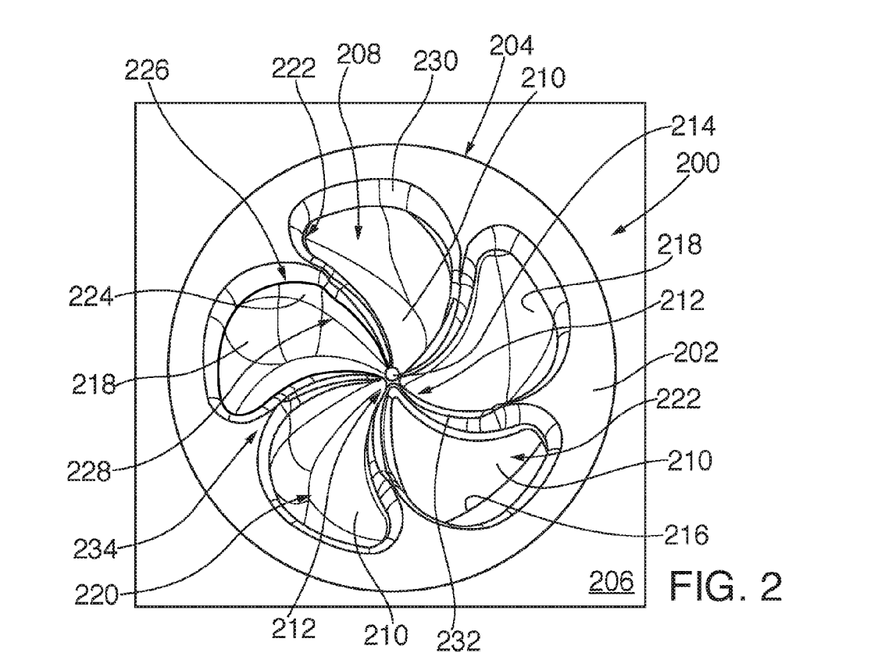
FIG. 2 is a top view of an engine piston in accordance with the disclosure.

An exemplary embodiment of the piston 112 is shown in FIG. 2. In the illustration of FIG. 2, only a top surface 200 of the piston crown 110 of the piston 112 is shown for simplicity. The top surface 200 has a generally circular shape that encloses a crown surface 202. The top surface 200 is defined within a circular periphery 204 and has a generally flat shape that extends along a single plane 206 that is nominally disposed in perpendicular relation to a centerline axis of the bore 102 (FIG. 1). Included within the top surface 200 is a plurality of arcuate indents 208, which have a concave shape extending away from the plane 206 in a direction into the body of the piston 112 (i.e., in a downward direction in the orientation shown in FIG. 1). In the illustrated embodiment, five arcuate indents 208 are shown, but fewer or more arcuate indents can be used on any one particular piston. In use, it is contemplated that there will be as many arcuate indents as nozzle openings in the injector tip such that each fuel jet provided by the injector will correspond to one arcuate indent of the piston. It should also be appreciated that not all arcuate indents might have the same shape. In this embodiment, the fuel injector 114 (FIG. 1) includes five nozzle openings formed in the tip 116 such that five fuel jets 118 are produced during engine operation. As shown, all five arcuate indents 208 have the same shape to redirect the five fuel jets 118 provided by the injector in the same of a similar, symmetrical fashion. When the piston 112 is reciprocally mounted in the bore 102 of the engine 101, the top surface 200 is oriented such that each of the fuel jets 118 is injected in a direction such that the fuel jet 118 enters into a respective arcuate indent 208 to be redirected thereby during engine operation.

Each arcuate indent 208 presents various flat, concave or convex surfaces, which directly or indirectly redirect the respective fuel jet provided into the arcuate indent 208 during operation. In the illustrated embodiment, each arcuate indent 208 includes a flat, entry surface 210. For each particular arcuate indent 208, the entry surface 210 lies along a plane that is disposed at an acute angle relative to the plane 206 of the piston crown. The entry surface 210 has a generally triangular shape with curved edges that includes a central point 212 disposed adjacent a piston surface center 214. The entry surface 210 extends away from the piston surface center 214 in a radial direction along the angled plane to provide a cambered or pitched surface that, during operation, engages and contacts the respective fuel jet to direct it along the plane and into the arcuate indent 208.

Opposite the central point 212, the entry surface 210 has a generally curved edge 216 that is sickle-shaped and may include a break or inflection, which forms a transition between the entry surface 210 and a recirculation surface 218. The recirculation surface 218, which forms a bottom-most portion of the arcuate indent 208, has a concave shape that sweeps in a spiral direction radially outwardly from the piston center portion along the curved edge 216. A cross section available for fuel jet redirection of the recirculation surface 218 is maximum along a middle portion thereof, adjacent a second point 220 of the entry surface 210, and decreases in both radial directions inwardly and outwardly with respect to the piston center portion such that it becomes minimum adjacent each of a third point 222 and the central point 212 of the generally triangular entry surface 210.

Each arcuate indent 208 further includes a wall 224 extending generally parallel or at a slight angle relative to a piston crown centerline or symmetry axis. The wall 224 has a variable width or height that is minimum along the wall's radially inward and outward ends, and maximum along a middle portion thereof. The wall 224 presents a top edge 226 having a generally curved shape and a bottom edge 228 that follows an external edge of the recirculation surface 218. At an interface or rim of each arcuate indent 208 with respect to the flat crown surface 202 is disposed a convex transition 230. A plurality of depressed surfaces 232 that bow away from the plane 206 of the crown surface 202 may also be formed around the piston such that the piston surface center 214 protrudes as a peak relative to the surrounding arcuate indents 208.

Figure 3:
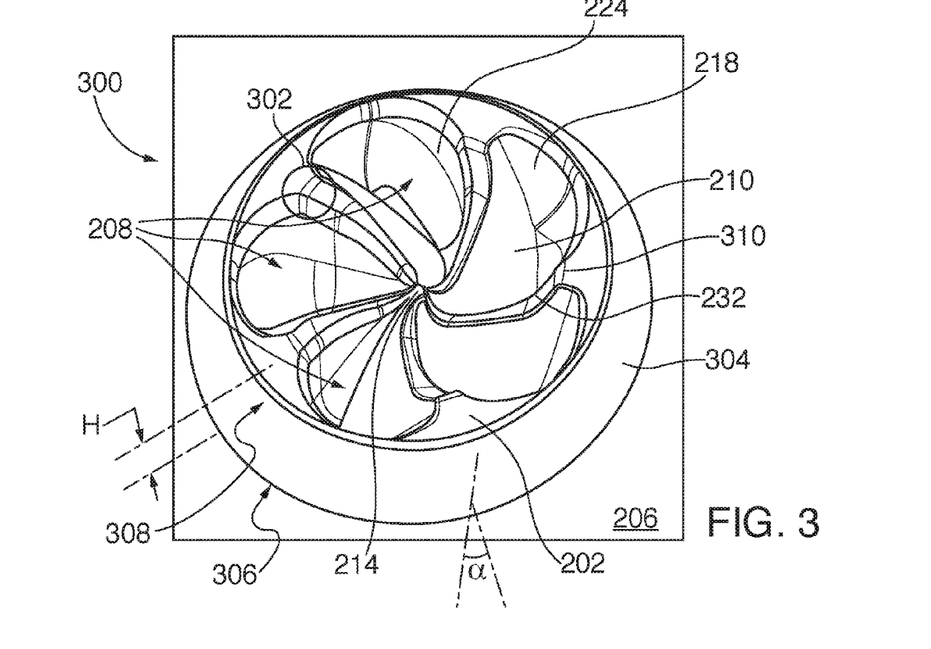
FIG. 3 is a perspective view of a top surface of a piston in accordance with an alternative embodiment.

An alternative embodiment for a top surface 300 of a piston in accordance with the disclosure is shown in FIG. 3. In this embodiment, the same or similar features and structures as the top surface 200 (FIG. 2) are denoted by the same reference numerals previously used for simplicity. The top surface 300, similar to the top surface 200, includes an arrangement of five arcuate indents 208, but in this embodiment, a transition between indents in a radially outward region 302 is truncated to create a segmented circular periphery 310 that surrounds the central depression around the piston surface center 214. For comparison, in the top surface 200, there is no pronounced periphery such that the flat crown surface 202 extends between the indents forming sharp angles 234.

The top surface 300 further includes a frusto-conical outer surface 304, which creates an empty space around a top, outer periphery of the piston. The outer surface 304 opens up the squish-region of the piston, that is, the region along the outer peripheral cylindrical surface of the piston that is disposed above the upper seal ring of the piston and occupies the cylindrical space between the piston and the inner surface of the piston bore. In the illustrated embodiment, the outer surface 304 extends at an acute angle, α, between a top edge 306 of the outer cylindrical portion of the piston crown and an outer periphery 308 of the flat crown surface 202, and occupies a height, H, in an axial direction along the centerline of the piston crown. It is contemplated that the angle, α, can be between 0 and 60 degrees, but other angles may also be used.

Figure 5:
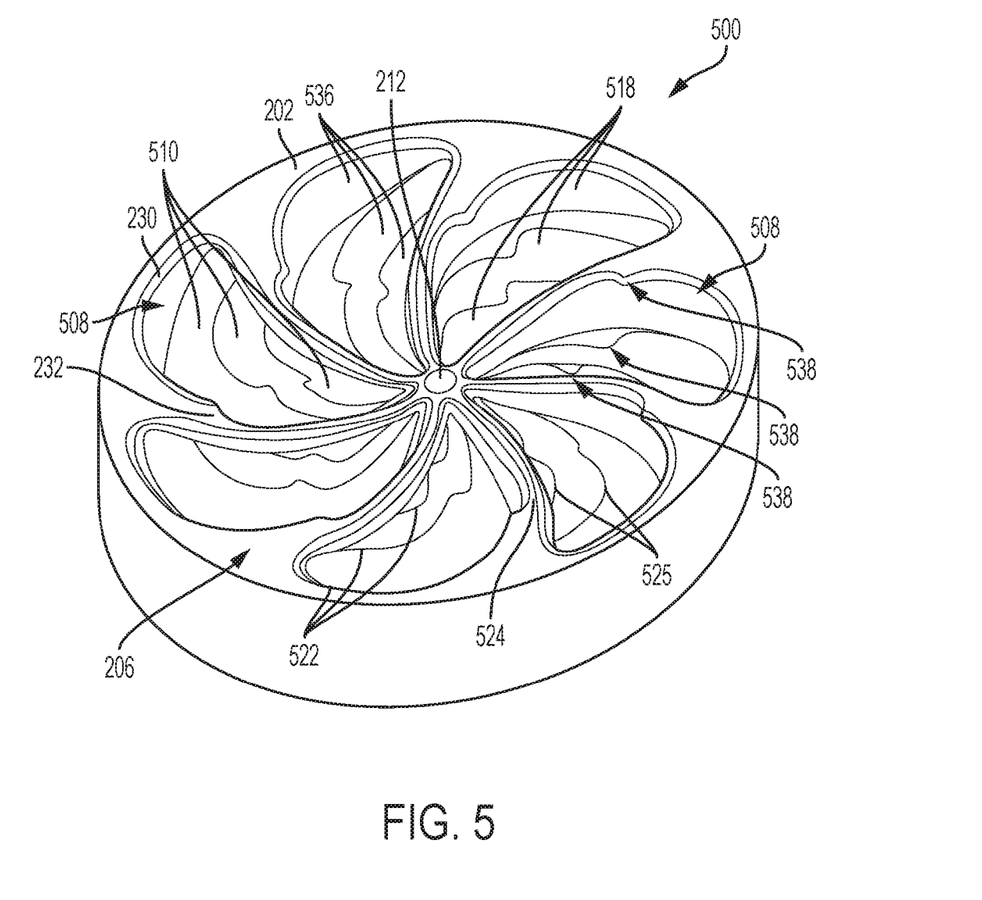
FIG. 5 is a perspective view of a top surface of a piston in accordance with an alternative embodiment.

An alternative embodiment for a top surface 500 of a piston in accordance with the disclosure is shown in FIG. 5. In this embodiment, the same or similar features and structures as the top surface 200 (FIG. 2) are denoted by the same reference numerals previously used for simplicity. The top surface 500, similar to the top surface 200, includes an arrangement of arcuate indents 508, but in this embodiment, seven arcuate indents are shown, which correspond to a fuel injector having seven nozzle openings for injecting a fuel jet. As in the previous described embodiments, the arcuate indents 508 are arranged symmetrically around a central point 212 of the piston top surface 500 and in aligned relation with each of a plurality of openings in an injector tip 116 (FIG. 1) such that each arcuate indent 508 receives a fuel jet for redirection and, in this embodiment, splitting into sub-jets.

More specifically, while each arcuate indent 508 operates to receive into its internal, concave cavity a fuel jet during engine operation. Where in the previously described embodiments the fuel jet was redirected by, for example, contact with the recirculation surface 218 (FIG. 2), in the embodiment illustrated in FIG. 5, each arcuate indent 508 is segmented into three lobes 536, each accepting a portion of a fuel jet and redirecting the respective fuel jet portion separately from the other lobes.

In reference to FIG. 5, each arcuate indent 508 presents various flat, concave or convex surfaces, which directly or indirectly separate the fuel jet discharged therein from the fuel injector into portions, and redirect each of the respective fuel jet portions during operation. Each lobe 536 includes a flat, entry surface 510 that lies along a plane that is disposed at an acute angle relative to the plane 206 of the piston crown. Each entry surface 510 has a generally crescent shape with curved edges that includes the central point 212. The entry surfaces 510 extend away from the piston surface center in a radial direction along the angled plane to provide a cambered or pitched surface that, during operation, engages and contacts the respective fuel jet to separate it into as many portions as there are lobes 536 within each arcuate indent 508, and direct the various fuel jet portions along the respective entry surface planes into the arcuate indent 508.

Opposite the central point 212, and along a curved edge extending radially away from the center, each entry surface 510 has a generally curved edge that is sickle-shaped and may include a break or inflection, which forms a transition between the entry surface 510 and a recirculation surface 518. The recirculation surfaces 518, which for the piston shown total twenty one, that is, three per each of the seven arcuate indents 508, form respective bottom-most portions of the lobes 536 of the arcuate indents 508. Each recirculation surface 518 has a concave shape that sweeps in a spiral direction radially outwardly from the piston center portion along the curved edges. The recirculation surfaces curl towards respective peaks 538, which are disposed relatively half-way in a radial direction along each lobe 536 and operate to augment a separation effect of a single fuel jet into portions as the fuel jet is being discharged into a given arcuate indent 508. A cross section available for fuel jet redirection of the recirculation surface 518 is maximum along a middle portion thereof, adjacent the peaks 538, and decreases in both radial directions inwardly and outwardly with respect to the piston center portion such that it becomes minimum adjacent each of a third point 522 and the central point 212 of the generally triangular entry surface 510.

Each arcuate indent 508 further includes a wall 524 extending generally parallel or at a slight angle relative to a piston crown centerline or symmetry axis that separates adjacent arcuate indents 508. Internally, each arcuate indent further includes two more walls 525 that separate the three lobes 536. The walls 524 and 525 have a variable width or height that is minimum along the wall's radially inward and outward ends, and maximum along a middle portion thereof. Each wall 524 and 525 presents a top edge having a generally curved shape and a bottom edge that follows an external edge of the recirculation surfaces 518. At an interface or rim of each arcuate indent 508 with respect to the flat crown surface 202 is disposed a convex transition 230. A plurality of depressed surfaces 232 that bow away from the plane 206 of the crown surface 202 may also be formed around the piston such that the piston surface center protrudes as a peak relative to the surrounding arcuate indents 508.

Figure 6:
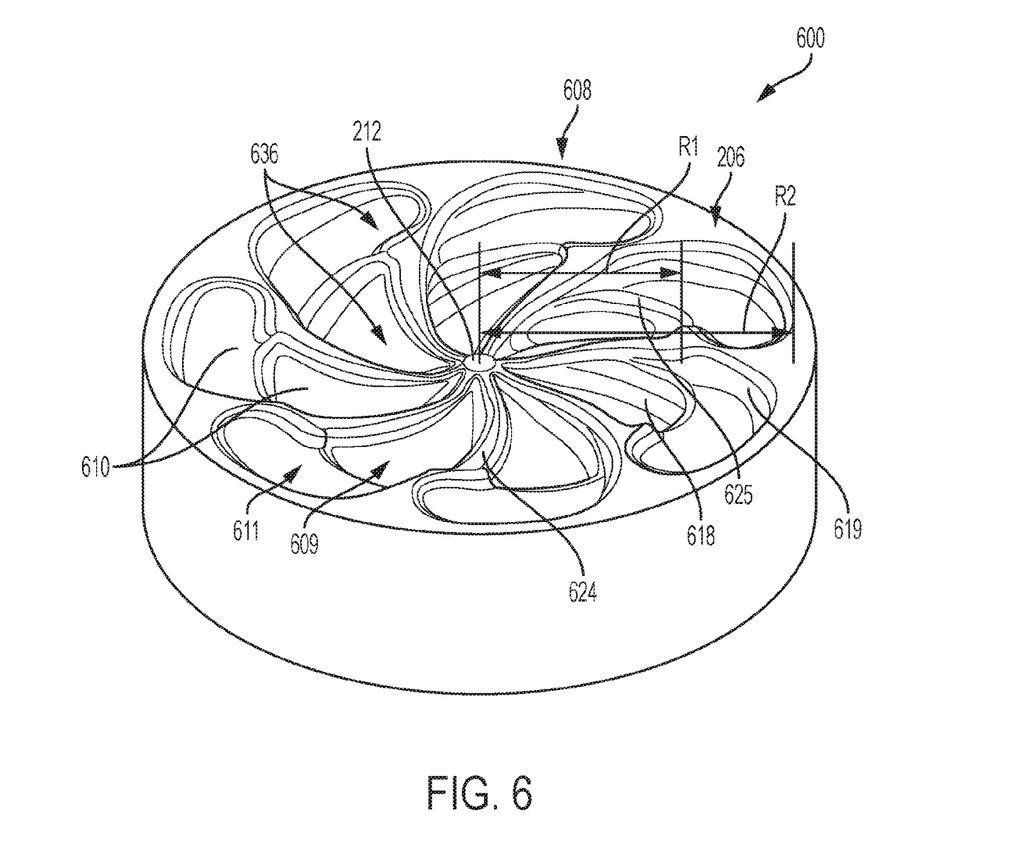
FIG. 6 is a perspective view of a top surface of a piston in accordance with a further alternative embodiment.

An alternative embodiment for a top surface 600 of a piston in accordance with the disclosure is shown in FIG. 6. In this embodiment, the same or similar features and structures as the top surface 200 (FIG. 2) or 500 (FIG. 5) are denoted by the same reference numerals previously used for simplicity. The top surface 600 includes an arrangement of arcuate indents 608. Seven arcuate indents 608, which correspond to a fuel injector having seven nozzle openings, each opening injecting a fuel jet for a total of seven fuel jets discharged into the combustion chamber of the engine during operation. As in the previous described embodiments, the arcuate indents 608 are arranged symmetrically around a central point 212 of the piston top surface 600 and in aligned relation with each of a plurality of openings in an injector tip 116 (FIG. 1) such that each arcuate indent 608 receives a fuel jet for redirection.

In this embodiment, the arcuate indents 608 are separated into two sets, each set configured to receive a fuel jet that is discharged at a different time or crank angle during engine operation. Stated differently, certain engines are configured for multiple or, at least, more than one fuel injection event into each combustion chamber per combustion cycle. For example, an injector may provide one or more pre-injections or pilot injections into the cylinder before a main injection, which may be followed by one or more post-injections into the same cylinder and for a single combustion cycle of that particular cylinder. Typically, the various pre-, main and post-injections are carried out at different times or crankshaft angles during operation. At those various times, the piston is disposed at different heights relative to the injector tip as it travels towards or away from the piston's top dead center (TDC) position within the piston bore. The arcuate indents 608 are thus subdivided into sets of tiers within each arcuate indent 608 that are configured to be aligned with the fuel jets provided from the injector tip at different relative heights of the arcuate indent features with the point of origination of the fuel jets.

More specifically, each arcuate indent 608 operates to receive into its internal, concave cavity more than one fuel jet during engine operation. Where in the previously described embodiments the fuel jet was redirected by, for example, contact with the recirculation surface 218 (FIG. 2), in the embodiment illustrated in FIG. 6, each fuel jet provided at different times into the arcuate indents 608 is redirected separately by two tier features 636 disposed in each arcuate indent 608. Each tier feature 636 accepts a portion of a fuel jet provided at different times and redirects the respective fuel jet portion separately from the other tiers formed in same arcuate indent and also in adjacent arcuate indents.

In reference to FIG. 6, each arcuate indent 608 presents various flat, concave or convex surfaces, which directly or indirectly separate the fuel jet discharged therein at different time from the fuel injector, and redirect each of the respective fuel jet portions during operation. Each tier 636 includes a flat, entry surface 610 that lies along a plane that is disposed at an acute angle relative to the plane 206 of the piston crown. Each entry surface 610 is generally flat. Entry surfaces closer to the center of the piston are generally triangular, similar to the embodiment shown in FIG. 2, and entry surfaces disposed radially outwardly are more kidney shaped. Two sets of entry surfaces 610, an inner set 609 and an outer set 611, extend away from the piston surface center in a radial direction to provide two cambered or pitched sets of surfaces that, during operation, engage and contact the respective fuel jets that are discharged at different times to separate them and direct them along the respective entry surface planes into the respective tiers 636 of the various arcuate indents 608. Although two sets are shown, more than two sets may be used depending on the expected number of injections of fuel that will be provided to the cylinder.

Opposite the central point 212, and along a curved edge extending radially away from the center, each of the inner set 609 of entry surfaces 610 has a generally curved edge that is sickle-shaped and forms a transition between the entry surface 610 and a recirculation surface 618. The recirculation surfaces 618, form respective bottom-most portions of the inner set 609 of tiers 636 of the arcuate indents 608 and are arranged to redirect fuel jets provided when the piston is relatively closer to the fuel injector than when the piston is relatively further away from the fuel injector. Each recirculation surface 618 has a concave shape that sweeps in a spiral direction radially outwardly from the piston center portion along the curved edges.

Each of the outer set 611 of entry surfaces 610 has a generally curved edge that is also sickle-shaped and extends from about the mid-portion of the recirculation surface of the inner set 609 to an outer region of the outer set 611 of entry surfaces 610. In general, for a given internal spread angle of fuel jets, β, as shown in FIG. 1, the inner set 609 of entry surfaces extends to a lesser radius, R1, from the center of the piston, while the outer set 611 of entry surfaces extends between the lesser radius, R1, to a larger radius, R2 with respect to the piston center. In this fashion, the fuel jets may be aimed within the inner set or the outer set of entry surfaces depending on the injection time and the then present distance of the piston from the injector or, stated differently, the then present axial position of the piston within the cylinder bore.

Each of the outer set 611 includes a recirculation surface 619. The recirculation surfaces 619, form respective bottom-most portions of the inner set 609 of tiers 636 of the arcuate indents 608 and are arranged to redirect fuel jets provided when the piston is relatively closer to the fuel injector than when the piston is relatively further away from the fuel injector. Each recirculation surface 618 has a concave shape that sweeps in a spiral direction radially outwardly from the piston center portion along the curved edges.

A cross section available for fuel jet redirection by the recirculation surfaces 618 and 619 is maximum along a middle portion thereof and decreases in both radial directions inwardly and outwardly with respect to the piston center portion such that it becomes minimum at around the center of the piston 212, on either side of the edge of the entry surface 610 of the outer sets 611 at around the radius R1, and along the outer portion of the features at around the radius R2.

Each arcuate indent 608 further includes a wall 624 extending generally parallel or at a slight angle relative to a piston crown centerline or symmetry axis that separates adjacent arcuate indents 608. Internally, each arcuate indent further includes a step 625 that separates the inner set 609 from the outer set 611 of entry surfaces 610. The walls 624 have a variable width or height that is minimum along the wall's radially inward and outward ends, and maximum along a middle portion thereof. The steps 625 generally extend along a peripheral region of the piston surface that extends up to the radius R1. As in the previous embodiments, the walls 624 present top edges having a generally curved shape and a bottom edge that extends across the steps 625.

INDUSTRIAL APPLICABILITY

The present disclosure is not only applicable to internal combustion engines having reciprocating pistons, as described relative to the embodiments illustrated herein, but also to other types of applications, such as gas turbines, industrial burners and the like. In general the various arcuate indents can be formed in a structure that the fuel will impinge upon when injected by an injector into a combustion chamber. The arcuate indents and the redirection and segregation of fuel jets and plumes they provide are effective in promoting faster and more uniform premixing of fuel and air in the combustion chambers of engines, and inhibit the entrainment of recirculated combustion products from downstream regions into upstream regions of a fuel jet injected into the combustion chamber.

Figure 4:
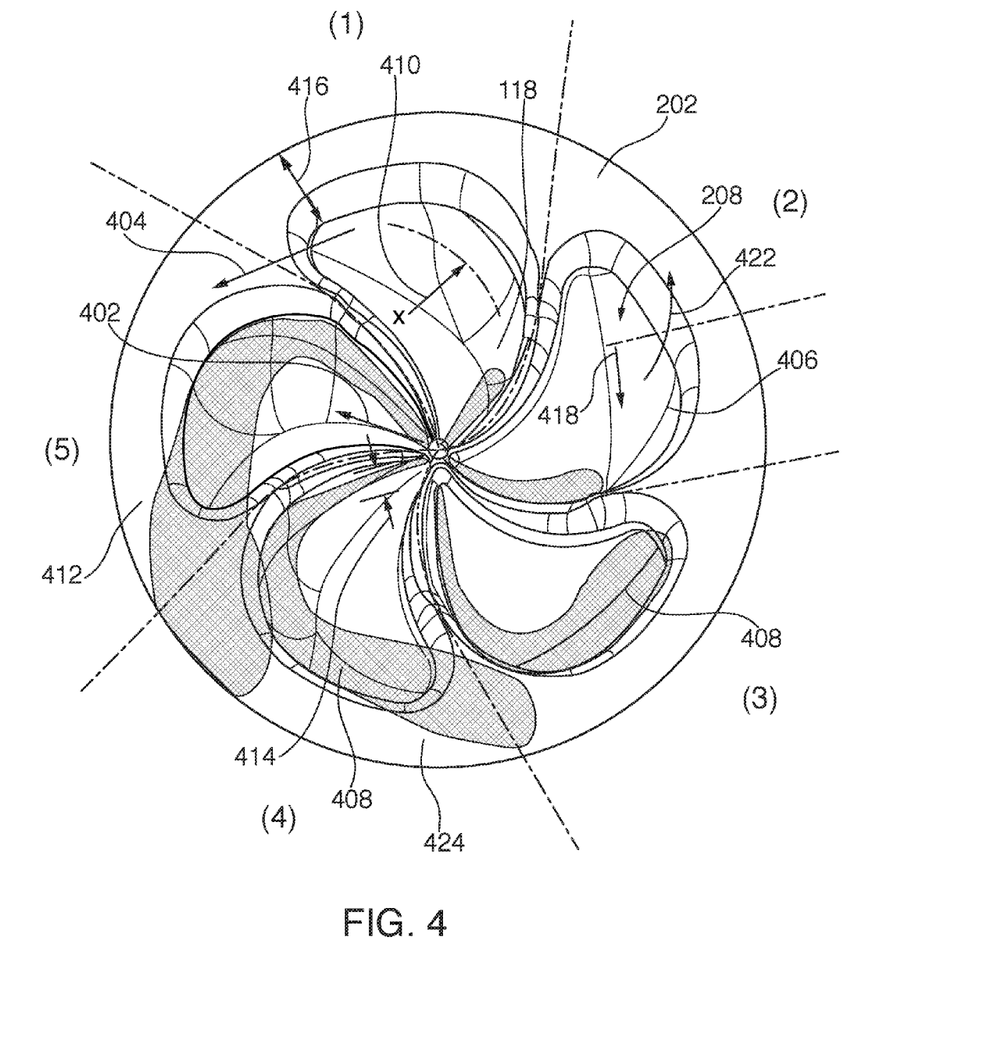
FIG. 4 is a schematic view of a top surface of a piston during various times in operation.

A time-lapse representation of the engagement and redirection of a fuel jet 118 in an arcuate indent 208 is shown for five time instances, all of which are represented together for illustration, in FIG. 4. The piston shown in FIG. 4 is segmented into five areas, a first area, denoted by "(1)," a second area, denoted by "(2)," a third area, denoted by "(3)," a fourth area, denoted by "(4)" and a fifth area, denoted by "(5)." While shown on a single piston, it should be appreciated that each of the first through fifth areas represents a snapshot of the position and distribution of a fuel jet in different instances of time, and also represent a different position of the piston in the bore, beginning at about −5 degrees after top dead center (dATDC), which can also be expressed as 5 degrees before top dead center (dBTDC), to about 30 dATDC. Of course, it should be appreciated that the distribution of the fuel jet and it interaction with the arcuate indent may change depending on the fuel injection timing of a particular engine application and combustion system.

Table 1 below illustrates the particular timing shown in the illustration of FIG. 4.

TABLE 1

| Position No. | Timing (dATDC) |
| --- | --- |
| (1) | −5 |
| (2) | −2 |
| (3) | 4 |
| (4) | 14 |
| (5) | 28 |

In reference now to FIG. 4, it can be seen that at the initiation of a fuel injection at the first position, a fuel jet 118 is provided at the entrance of an arcuate indent 208 at an entrance of floor angle 402, which can be between about 15 and 30 degrees with respect to the plane 206 of the top surface or crown surface 202. The entrance or floor angle 402 depends on the inclination of the entry portion of the arcuate indent and/or the inclination of the nozzle openings in the particular fuel injector providing the fuel jet and the axial position of the piston within the bore. As will be described below, the fuel will exit the arcuate indent at an exit angle 404, which depends on the shape of the radially outward portion of the indent and defines an interaction of the fuel jet with the cylinder head and the adjoining jets. The exit angle 404 in the illustrated embodiment can be between 10 and 60 degrees.

At the second position, which occurs moments after the first position, the fuel jet has contacted the recirculation surface and begins to spread into a wider region of contact 406 as fuel from the jet is redirected by contacting the recirculation surface. As the redirected fuel follows the recirculation surface, it will reach a depth 418 that is between 5 and 20 percent of the bore diameter, and turn around a bend radius 410 that is about 5 and 30 percent of the bore diameter. At the same time, the fuel will be redirected upwards and away from the piston face, in a re-entrant direction 422, which will create an inward motion of the fuel plume created from the jet that overhangs the trailing portion of the jet by between 0 and 12 percent of the radial length occupied by the jet and resulting plume. Because the radial location at which the fuel jet enters and exits the arcuate indent will change depending on the axial distance of the piston from the fuel injector nozzle openings, a radial entrance position 414 may be between 0 and 31 percent of the bore diameter, while a radial exit position 416 may be between 5 and 50 percent of the bore diameter.

Accordingly, at the third position, the fuel jet has continued and the region of the jet that has been redirected 408 has extended to occupy a larger portion of the recirculation surface. It is noted that a radial component of the velocity or momentum of the fuel jet causes the fuel to follow the recirculation surface as a redirected jet 408, which now forms a stream, moves in a radially outward and spiral path.

At the fourth position, the redirected jet 408 reaches an end of the arcuate indent and its momentum carries away from the piston to form a plume 424 that is directed in an upward direction away from the piston. Because of the shape of the redirected jet feeding the plume creation, the plume tends to concentrate in one direction that does not immediately infringe or stray in a direction of a neighboring plume created by an adjacent arcuate indent. In this way, the various plumes are segregated as the fuel jets are redirected to permit better fuel/air mixing in the combustion chamber, as previously described.

At the fifth position, a majority of the fuel provided from the injector is now present in a plume 412 that has mostly exited the arcuate indent in an "upward" direction or, stated differently, in a direction away from the piston face and towards the interior portion of the combustion chamber while the jet is already burning or is about to begin burning. As can be seen from the illustration of FIG. 4, some of the radial component of the momentum of the fuel may cause the plume 412 to drift in a radially outward direction. In addition to some radial outward motion, the plum has left the piston with some upward trajectory away from the piston such that the plume is still segregated or mostly or generally separated from mixing with plumes of adjacent arcuate indents.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An internal combustion engine, comprising: an engine block having at least one cylinder bore; a cylinder head having a flame deck surface disposed at one end of the cylinder bore; a piston connected to a rotatable crankshaft and configured to reciprocate within the cylinder bore, the piston having a crown portion facing the flame deck surface such that a combustion chamber is defined within the cylinder bore and between a top surface of the crown portion and the flame deck surface, wherein the top surface of the crown portion has a generally circular shape that is defined within a circular periphery and has a generally flat shape that extends along a single plane that is nominally disposed in perpendicular relation to a centerline axis of the cylinder bore; a fuel injector having a nozzle tip disposed in fluid communication with the combustion chamber, the nozzle tip having at least one nozzle opening configured to inject a fuel jet into the combustion chamber and along a fuel jet centerline; a plurality of arcuate indents formed in the top surface of the crown portion, the plurality of arcuate indents being arranged to cover the crown portion in aligned relation with a plurality of nozzle openings formed in the nozzle tip of the fuel injector and along a respective fuel jet centerline, each of the plurality of arcuate indents including a flat entry surface and further including two or more lobes, each of the two or more lobes includes the flat entry surface extending from a central portion of the piston, a recirculation surface having a concave shape and extending along a spiral direction adjacent the flat entry surface, and a wall extending generally in an axial direction and disposed radially along the recirculation surface; wherein each flat entry surface lies along a respective angled plane that is disposed at an acute angle relative to a plane of the top surface of the crown portion; wherein each flat entry surface has a generally triangular shape with curved edges that includes a central point disposed adjacent a piston surface center; wherein the flat entry surface extends away from the piston surface center in a radial direction along the respective angled plane; and wherein, during operation, a single fuel jet provided into each of the plurality of arcuate indents is separated into a plurality of fuel jet portions, each of the plurality of fuel jet portions corresponding to one of the two or more lobes.

2. The internal combustion engine of claim 1, wherein each of the arcuate indents has a concave shape extending away from the plane of the top surface of the crown portion in a direction into a body of the piston, and wherein each of the plurality of arcuate indents presents flat, concave or convex surfaces, which directly or indirectly redirect a respective fuel jet provided into each of the plurality of the arcuate indents during operation of the internal combustion engine.

3. The internal combustion engine of claim 1, wherein, opposite the central point of the top surface of the crown portion, the flat entry surface of each of the two or more lobes has a generally curved edge that is sickle-shaped, which forms a transition between the flat entry surface and the recirculation surface.

4. The internal combustion engine of claim 1, wherein each recirculation surface forms a bottom-most portion of the corresponding one of the two or more lobes of each of the plurality of arcuate indents.

5. The internal combustion engine of claim 4, wherein each recirculation surface has a concave shape that sweeps in the spiral direction radially outwardly from a center portion of the piston along a corresponding curved edge of the flat entry surface.

6. An internal combustion engine, comprising: an engine block having at least one cylinder bore; a cylinder head having a flame deck surface disposed at one end of the cylinder bore; a piston connected to a rotatable crankshaft and configured to reciprocate within the cylinder bore, the piston having a crown portion facing the flame deck surface such that a combustion chamber is defined within the cylinder bore and between a top surface of the crown portion and the flame deck surface, wherein the top surface of the crown portion has a generally circular shape that is defined within a circular periphery and has a generally flat shape that extends along a single plane that is nominally disposed in perpendicular relation to a centerline axis of the cylinder bore; a fuel injector having a nozzle tip disposed in fluid communication with the combustion chamber, the nozzle tip having at least one nozzle opening configured to inject a fuel jet into the combustion chamber and along a fuel jet centerline; a plurality of arcuate indents formed in the top surface of the crown portion, the plurality of arcuate indents being arranged to cover the crown portion in aligned relation with a plurality of nozzle openings formed in the nozzle tip of the fuel injector and along a respective fuel jet centerline, each of the plurality of arcuate indents including two or more lobes, each of the two or more lobes including an entry surface extending from a central portion of the piston, a recirculation surface having a concave shape and extending along a spiral direction adjacent the entry surface, and a wall extending generally in an axial direction and disposed radially along the recirculation surface; wherein each recirculation surface forms a bottom-most portion of the corresponding one of the two or more lobes of the arcuate indent and has a concave shape that sweeps in the spiral direction radially outwardly from a center portion of the piston along a curved edge of the entry surface; and wherein, during operation, a single fuel jet provided into each of the plurality of arcuate indents is separated into a plurality of fuel jet portions, each of the plurality of fuel jet portions corresponding to one of the two or more lobes.

7. The internal combustion engine of claim 6, wherein each of the plurality of arcuate indents has a concave shape extending away from the single plane in a direction into a body of the piston, and wherein the plurality of arcuate indents present flat, concave or convex surfaces, which directly or indirectly redirect the fuel jet provided into the plurality of arcuate indents during operation of the internal combustion engine.

8. The internal combustion engine of claim 6, wherein each of the plurality of arcuate indents includes a flat entry surface.

9. The internal combustion engine of claim 8, wherein the flat entry surface lies along an angled plane that is disposed at an acute angle relative to the single plane of the top surface of the crown portion.

10. The internal combustion engine of claim 9, wherein each flat entry surface has a generally triangular shape with curved edges that includes a central point disposed adjacent a piston surface center, and wherein each flat entry surface extends away from the piston surface center in a radial direction along the angled plane.

11. The internal combustion engine of claim 9, wherein, opposite a central point of the top surface of the crown portion, the flat entry surface of each of the two or more lobes has a generally curved edge that is sickle-shaped, which forms a transition between the flat entry surface and the recirculation surface.

12. An internal combustion engine, comprising: an engine block having at least one cylinder bore; a cylinder head having a flame deck surface disposed at one end of the cylinder bore; a piston connected to a rotatable crankshaft and configured to reciprocate within the cylinder bore, the piston having a crown portion facing the flame deck surface such that a combustion chamber is defined within the cylinder bore and between a top surface of the crown portion and the flame deck surface, wherein the top surface of the crown portion has a generally circular shape that is defined within a circular periphery and has a generally flat shape that extends along a single plane that is nominally disposed in perpendicular relation to a centerline axis of the cylinder bore; a fuel injector having a nozzle tip disposed in fluid communication with the combustion chamber, the nozzle tip having at least one nozzle opening configured to inject a fuel jet into the combustion chamber and along a fuel jet centerline; a plurality of arcuate indents formed in the top surface of the crown portion, the plurality of arcuate indents being arranged to cover the crown portion in aligned relation with a plurality of nozzle openings formed in the nozzle tip of the fuel injector and along a respective fuel jet centerline, each of the plurality of arcuate indents including a flat entry surface and further including two or more lobes, each of the two or more lobes includes the flat entry surface extending from a central portion of the piston, a recirculation surface having a concave shape and extending along a spiral direction adjacent the flat entry surface, and a wall extending generally in an axial direction and disposed radially along the recirculation surface; wherein each flat entry surface lies along a respective angled plane that is disposed at an acute angle relative to a plane of the top surface of the crown portion; wherein, opposite a central point of the top surface of the crown portion, each flat entry surface of each of the two or more lobes has a generally curved edge that is sickle-shaped, which forms a transition between the flat entry surface and the recirculation surface; wherein, during operation, a single fuel jet provided into each of the plurality of arcuate indents is separated into a plurality of fuel jet portions, each of the plurality of fuel jet portions corresponding to one of the two or more lobes.

13. The internal combustion engine of claim 12, wherein each arcuate indent has a concave shape extending away from the single plane in a direction into a body of the piston, and wherein each of the plurality of arcuate indents presents flat, concave or convex surfaces, which directly or indirectly redirect the fuel jet provided into the plurality of arcuate indents during operation of the internal combustion engine.

14. The internal combustion engine of claim 12, wherein each flat entry surface has a generally triangular shape with curved edges that includes a central point disposed adjacent a piston surface center, and wherein each flat entry surface extends away from the piston surface center in a radial direction along the respective angled plane.

15. The internal combustion engine of claim 12, wherein each recirculation surface forms a bottom-most portion of the corresponding one of the two or more lobes of the plurality of arcuate indents, and wherein each recirculation surface has a concave shape that sweeps in the spiral direction radially outwardly from a center portion of the piston along a curved edge of the flat entry surface.

* * * * *